Inventor:
Irving Cowles

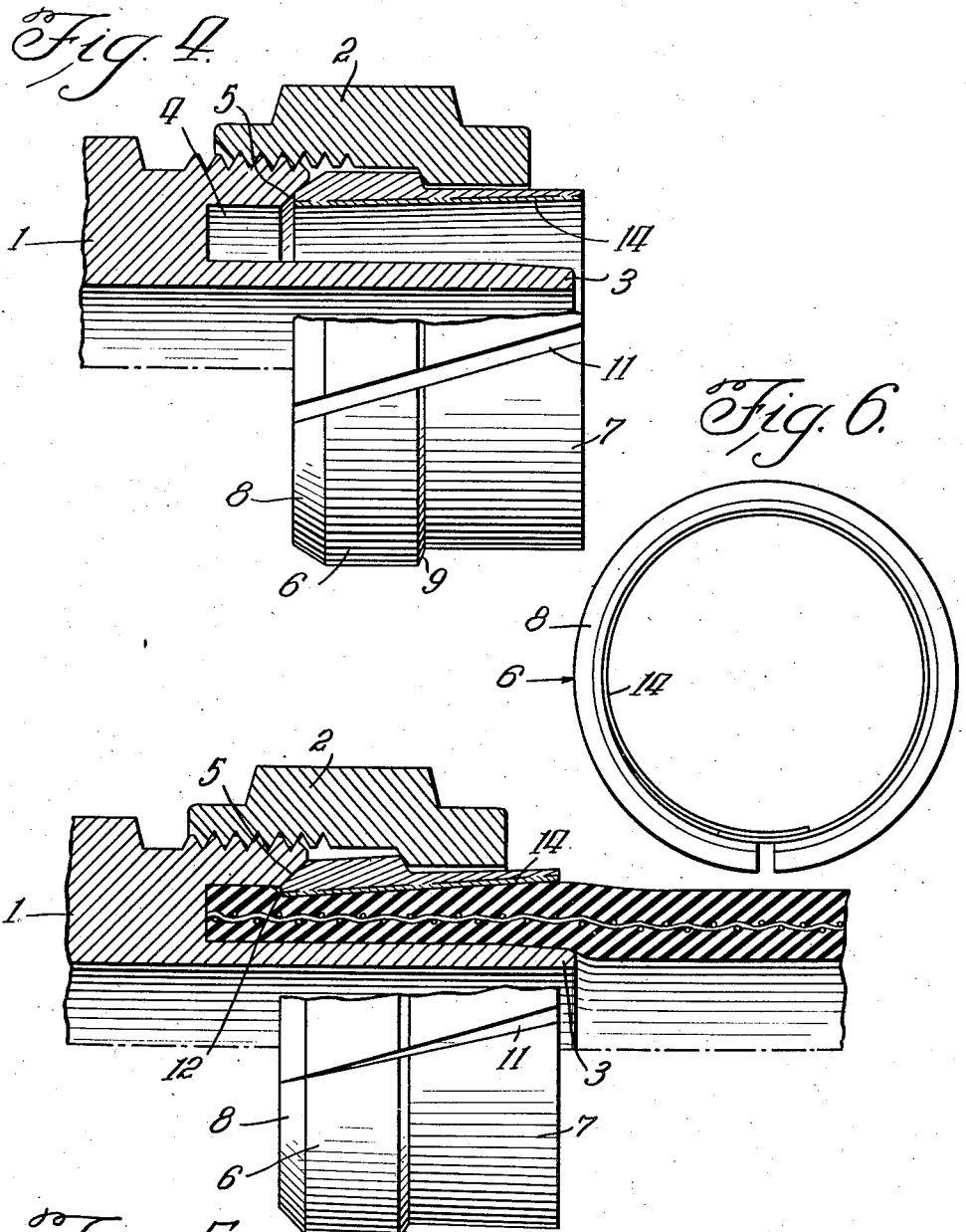

Patented Dec. 26, 1944

2,365,747

UNITED STATES PATENT OFFICE 2,365,747

DETACHABLE HOSE COUPLING

Irving Cowles, Detroit, Mich., assignor to Irving Cowles and Rudolph W. Lotz, Chicago, Ill., successor cotrustees to Union Bank of Chicago, Illinois, a corporation of Illinois Application November 19, 1941, Serial No. 419,674

5 Claims. (Cl. 285—86)

This invention relates to improvements in hose couplings of the detachable type and has for its main object to provide a structure of that type which is particularly adapted for use on hoses of several different structural kinds ranging from high to low pressure service.

Another object of the invention is to provide a very compact hose-coupling of low cost and high degree of efficiency wherein means are included for limiting the extent to which a hose end portion may be contracted and wherein provision is made to so progressively vary the compression of said hose end portion as to provide for complete relief of compression stress on the same at or adjacent the mouth of the coupling for preventing fracture of the hose at this point due to bending the hose in the manipulation thereof.

Suitable embodiments of the invention are illustrated in the accompanying drawings, wherein:

Figs. 4 and 5 are views similar to Figs. 1 and 2, respectively, showing other structural modifications.

Fig. 6 is an end elevation of the hose end compressing sleeve of Figs. 4 and 5.

The embodiments of the invention are so simple and readily understood by persons skilled in the art that they are described below substantially en masse.

The coupling of this invention comprises, in each of Figs. 1 to 5 inclusive, a body member 1 and a sleeve nut 2 having threaded engagement with the same.

Figure 1:
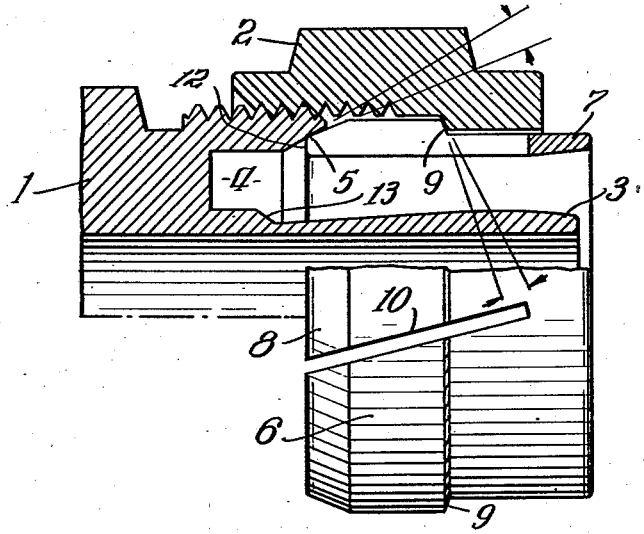
Fig. 1 is a fragmentary central longitudinal sectional view of a hose coupling constructed in accordance with the invention, the hose end compressing element of said structure being shown partly in elevation and partly broken away.
Figure 2:
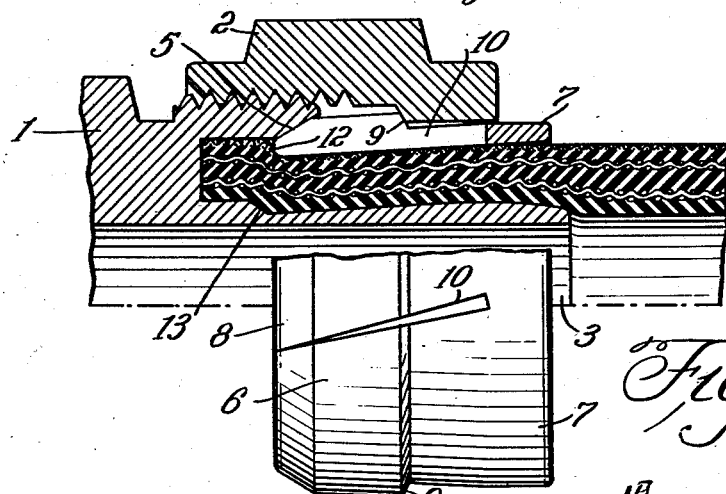
Fig. 2 is a view similar to Fig. 1 showing a hose end portion engaged in the coupling and the parts of the latter shown in hose end compressing relation to each other.
Figure 3:
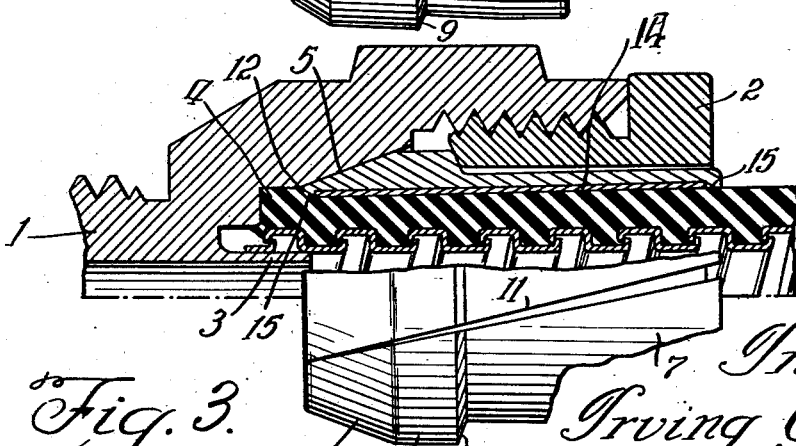
Fig. 3 is a view similar to Fig. 2 showing a modified form of construction of the coupling to adapt the same for use in connection with the metal lined hose therein illustrated.

In the instance of Figs. 1, 2, 4 and 5, the body member 1 is threaded externally to engage the internal threads of the member 2, while in Fig. 3 the reverse is true.

In each of Figs. 1 to 5 inclusive, the body member is equipped with an axial stem 3 to enter the duct of the hose, said stem of Fig. 3 being very short while in Figs. 1, 2, 4 and 5. the stem is long for reasons hereinafter pointed out.

Each of the several body members 1 is equipped with an annular space or pocket 4 to receive the extremity portion of the hose end portion to be received within the body member as particularly shown in Figs. 2, 3 and 5.

In all instances the body member 1 is provided with a tapered portion 5 of smallest diameter at its meeting with the outer wall of the pocket 4, the degree of the taper of said bore portion 5 being varied.

Each coupling also includes a split or longitudinally slotted sleeve 6 with the slot or slots thereof extending angularly of a line in the sleeve parallel with its axis. Each of said sleeves includes a head end portion to which the reference numeral 6 is applied, and a skirt portion 7 of appreciably smaller diametric dimensions than the head portion 6 of the same.

The sleeves 6 are contractible at least in part and are preferably normally cylindrical internally and are composed of a resilient metal.

Each of the structures of Figs. 1 to 5 inclusive provides means for limiting the degree to which the sleeve 6 thereof may be contracted, thereby to limit the extent to which the hose wall projecting into the body member may be compressed either upon the long stems of Figs. 1, 2, 4 and 5, or with respect to the metal lining of the hose shown in Fig. 3.

Each of the structures of Figs. 1 to 5 inclusive, includes means whereby the sleeve 6 thereof is caused to become tapered throughout all or substantially all of its length when contracted to compress the hose wall.

In every instance the head end 6 of the slotted sleeve terminates in a tapered nose portion 8 which enters the tapered bore portion of the body member and is contracted by the latter responsively to force applied by the sleeve nut 2 against the annular shoulder 9 of the sleeve 6.

In instances where the slot 11 of a sleeve 6 extends from end to end of the latter, as in Figs. 3, 4 and 5, the extent to which said sleeve is contractible may be controlled by the width of the slot 11 as fixed by the meeting of the side walls of said slot 8. Each of said sleeves of Figs. 3, 4 and 5, may, however, be provided also with one or more slots 10 of the type shown in Figs. 1 and 2 spaced equidistantly from each other and the slot 8 and the degree of contraction of the sleeve limited by the meeting of the walls of the several slots. On the other hand, if the combined widths of the several slots will permit contraction of the sleeve to a degree in excess of a predetermined limit such contraction may be limited by limiting the inward movement of the sleeve nut 2 by contact with the end of the body member 1, as shown in Fig. 3.

Similarly the sleeve 6 of Figs. 1 and 2 may be equipped with a plurality of equally spaced apart slots 10 and contractions of said sleeve controlled, as in the structure of Fig. 3. As an alternative to the latter, the combined widths of the several slots 10 of said sleeve may be such that contraction of the sleeve is limited by the meetings of the walls of the several slots before the sleeve nut contacts the end of the body member 1.

Each nose portion of the several sleeves terminates in an annular shoulder 12 which becomes progressively more deeply embedded in the hose wall during inward movement of the sleeve responsively to rotation of the nut 2 and acts to displace and compress hose wall material into the annular space or pocket 4 of the body member to provide an end seal to prevent leakage in the event that seepage of fluid shall occur between the stem of the coupling and the hose. This means for preventing leakage is particularly important in the structure of Fig. 3 as constituting the only leakage preventing means, the sole purpose of the short stem of Fig. 3 being to prevent contraction of the metal lining of the hose therein shown and consequent choking of flow of fluid into or from said hose.

In the structure of Figs. 1 and 2, the stem of the body member is reduced in outer diameter progressively from its outer end portion to the mouth of the pocket 4 so that the inner portion of hose end may be distorted as shown in Fig. 2 to cause the inner tube of the hose end to abut and be compressed against the annular shoulder 13 of the stem.

As shown in Fig. 1, it is preferable that the tapered bore portion of the body member 1 shall differ from the taper of the nose portion of the sleeve 6 slightly, as by an angle of one to three degrees so that the walls of the slot 10 of said sleeve shall be caused to meet first at the extremity of said nose portion and the opposed tapered surfaces presented caused to meet, as in Fig. 2, as the sleeve attains the inner limit of its movement.

In the structure of Figs. 1 and 2 the outer end portion of the sleeve 6 will retain its normal shape and the remainder of the sleeve will become slightly tapered. It will be noted that in Fig. 2 a slot 10 is shown at the top of said sleeve.

As shown in Figs. 3 to 6 inclusive, the sleeve 6 may be equipped with a tubular lining 14 of resilient sheet metal composed of a strip of the latter having overlapping ends to permit contraction of the said lining responsively to contraction of the sleeve. The purpose of said lining is to prevent hose wall material being projected into the slots 8 and 9 during contraction of the sleeves. Said lining may be secured to the sleeves at a suitable point or points by spot-welding or other suitable method as along the middle of the lining strip.

As an alternative to securing the lining sleeve 14 to the slotted sleeve 6, as above described, said lining may be confined between inturned end flanges 15 of the sleeve 6, as shown in Fig. 3.

A particularly advantageous feature of the several structures lies in the fact that greatest degree of compression of the hose wall occurs as the nose portion of the split sleeve is fully contracted and becomes progressively less pronounced toward the outer end of the sleeve where said compression vanishes, and serves to leave the hose bendable at substantially the vanishing point of compression thereof without injury thereto.

Further advantages of the structures lie in the fact that any one of the several sleeves 6, except that of Fig. 3, may be caused to compress the hose end to any desired degree by merely increasing the number or width of the slots therein so long as the inward movement of the sleeve nut is not limited as in Fig. 3, it being obvious that increase in number or width of slots is applicable also to the sleeve 6 of Fig. 3 if the limitation of inward movement of the sleeve nut 2 of the latter is eliminated.

The degree to which the sleeve 6 displaces and forces hose wall material into the annular pocket 4 is controlled by the taper of the bore portion of the male member, it being obvious that in Figs. 1 and 2, the contraction of the nose portion of the sleeve 6 is effected by a shorter longitudinal movement thereof than is true of the structure of Fig. 3.

Other advantages common to the several structures illustrated lie in the strength of the sleeves 6 and the fact that the pressure of the sleeve nut upon the end of the sleeve is insufficient to cause any tortional stress on the hose due to the tendency of the sleeve to rotate responsively to rotation of the nut 2. This constitutes an important distinction from the structure of the Cowles Patent No. 1,532,886, wherein the sleeve nut rotates about the hose compressing fingers.

The absolute control of the degree of compression of the hose to be effected by the slotted sleeves of the several structures described and illustrated, either by meeting of the side walls of slots of the sleeves 6 or by limiting the inward movement of the sleeve nut with respect to the male member is of the essence of the invention.

While the invention is illustrated and described as embodied in a hose coupling, it will be obvious that the body member 1, sleeve nut 2 and slotted sleeves 6 may be designed to receive and seat flanged metal tubing of soft metal capable of being contracted by the radial pressure exerted thereon by the nose portion of the sleeve 6 while the latter is also moving toward the seat for the tube flange.

A feature of importance of the split sleeve of the coupling is that the head end portion of the latter is of such thickness that it cannot be bent by the force to which it is subjected while the tail end portion of said sleeve is sufficiently flexible to yield to bending stress resulting from the complete or partial contraction of the nose portion of said head portion as above described and progressively less degree of contraction of same toward its annular shoulder, especially where the slotting of said sleeve does not extend through the entire tail end portion of same.

Thus the split sleeve cannot be permanently distorted or remain contracted or be broken by the stresses imposed upon it but remains intact for reuse as often as required.

I claim as my invention:

1. A hose coupling comprising a body member equipped with a stem and a flange concentric therewith, a sleeve-nut threaded upon the said flange and equipped with an annular shoulder opposed to the end of the body flange, a normally internally cylindrical resilient sleeve equipped with a slot extending from end to end thereof and having a head portion presenting a tapered nose portion engaged with said body flange and presenting a shoulder opposed to and engageable with the nut-shoulder, said sleeve including a shank portion of smaller outer diameter than said head portion and extending at least to the mouth of said sleeve-nut when the latter is disposed at the inner limit of its movement relative to the body member, rotation of said nut in one direction causing said sleeve to be contracted radially to maximum degree at its inner extremity and to a progressively less degree from the latter toward its outer extremity without effecting contraction of the latter.

2. A structure as defined in claim 1 wherein the said slot of said sleeve is of a predetermined width at the inner extremity of said sleeve, thereby to limit the degree of contraction of said inner extremity and limit the last-mentioned movement of said sleeve-nut.

3. A flexible conduit comprising a length of hose, a resilient radially contractible split-sleeve mounted upon the hose, a sleeve nut mounted upon said split sleeve between its ends, a body member having threaded engagement with said nut and equipped with an axial stem projecting into the hose throughout substantially the entire length of said sleeve, said body member equipped with a bore portion around the inner end of the stem which is equipped with a flared mouth, said sleeve equipped with a contracted radially enlarged head portion having a tapered extremity engaged in said flared mouth portion, and said head portion and nut equipped with interengaged annular shoulders whereby said head portion is maintained contracted to smaller diameter than the hose while the outer extremity of said hose remains uncontracted, said contracted sleeve having a tapered bore adapted to become self-restoring to substantially cylindrical bore and rendered removable from the hose for re-use when the sleeve-nut is disengaged from the body member.

4. A structure as defined in claim 3 wherein the split sleeve is equipped with a single longitudinal slot extending from end to end thereof.

5. A structure as defined in claim 3 wherein the outermost end portion of the split sleeve is of slightly larger inner diameter than the hose and the hose is contracted to a progressively decreasing degree from the inner extremity of said sleeve to a point adjacent the larger diameter end portion of the latter and throughout the major portion of the length of said sleeve.

IRVING COWLES.